(12) United States Patent
Ding et al.

(10) Patent No.: US 10,567,557 B2
(45) Date of Patent: Feb. 18, 2020

(54) AUTOMATICALLY ADJUSTING TIMESTAMPS FROM REMOTE SYSTEMS BASED ON TIME ZONE DIFFERENCES

(71) Applicant: Splunk Inc., San Francisco, CA (US)

(72) Inventors: Lai Qiang Ding, Shanghai (CN); Ziliang Chen, Shanghai (CN); Junqing Hao, Shanghai (CN); Ting Wang, Shanghai (CN)

(73) Assignee: Splunk Inc., San Francisco, CA (US)

( * ) Notice: Subject to any disclaimer, the term of this patent is extended or adjusted under 35 U.S.C. 154(b) by 18 days.

(21) Appl. No.: 14/889,764

(22) PCT Filed: Oct. 31, 2014

(86) PCT No.: PCT/CN2014/090048
§ 371 (c)(1),
(2) Date: Nov. 6, 2015

(87) PCT Pub. No.: WO2016/065617
PCT Pub. Date: May 6, 2016

(65) Prior Publication Data
US 2017/0201606 A1     Jul. 13, 2017

(51) Int. Cl.
*H04L 12/26*     (2006.01)
*H04L 29/08*     (2006.01)
*H04L 29/06*     (2006.01)

(52) U.S. Cl.
CPC .......... *H04L 69/28* (2013.01); *H04L 43/0852* (2013.01); *H04L 67/10* (2013.01)

(58) Field of Classification Search
CPC ..... H04L 1/00; H04L 1/08; H04L 1/24; H04L 7/00; H04L 7/0016; H04L 7/0033;
(Continued)

(56) References Cited

U.S. PATENT DOCUMENTS 6,553,336 B1 * 4/2003 Johnson ............... G01D 3/022
                                                            702/188
7,145,837 B2 * 12/2006 Herring .................. G06F 1/12
                                                              368/46
(Continued)

FOREIGN PATENT DOCUMENTS

CN     1968077 A     5/2007
CN     103152118 B   8/2015
(Continued)

OTHER PUBLICATIONS

Plost33 et al. (Round time to nearest 15 minutes—MREXCEL—2008).*

(Continued)

*Primary Examiner* — Arvin Eskandarnia
*Assistant Examiner* — Boris D Grijalva Lobos
(74) *Attorney, Agent, or Firm* — Wong & Rees LLP; Kirk D. Wong

(57) ABSTRACT

The disclosed embodiments provide a system that processes data received from a remote system. During operation, the system sends, from a computer system to a remote system, a request for a local time at the remote system and records a time of transmission of the request. Next, the system obtains, from the remote system, a response to the request, wherein the response includes the local time of the remote system. The system then computes a difference between the time of transmission and the local time of the remote system to determine a time offset that accounts for a time difference between the computer system and the remote system. Finally, the system uses the time offset to standardize timestamps in time-series data received from the remote system, wherein standardizing the timestamps associated with the time-series data comprises adjusting the timestamps to conform to a time standard.

28 Claims, 15 Drawing Sheets

(58) Field of Classification Search
CPC . H04L 7/02; H04L 29/02; H04L 29/06; H04L 29/06993; H04L 29/08; H04L 29/08081; H04L 29/08135; H04L 29/08576; H04L 29/08603; H04L 29/08612; H04L 29/14; H04L 41/00; H04L 41/06; H04L 41/0654; H04L 41/08–0876; H04L 43/00; H04L 43/04; H04L 43/08–0864; H04L 43/10–106; H04L 67/00; H04L 67/10; H04L 67/14; G06F 1/00; G06F 1/04; G06F 1/12; G06F 11/00; G06F 11/004; G06F 11/30–3006; G06F 11/3051; G06F 11/3055; G06F 11/3058; G06F 15/00; G06F 15/16; G06F 15/163
See application file for complete search history.

(56) References Cited

U.S. PATENT DOCUMENTS

| | | | | |
|---|---|---|---|---|
| 7,809,131 | B1* | 10/2010 | Njemanze | G06F 21/725 380/2 |
| 8,180,875 | B1* | 5/2012 | Dave' | G06F 1/14 709/223 |
| 8,316,155 | B2* | 11/2012 | Liu | G06F 1/14 709/224 |
| 8,972,543 | B1* | 3/2015 | Park | H04L 43/50 709/206 |
| 9,735,831 | B1* | 8/2017 | Juntunen | H04J 3/0667 |
| 9,996,571 | B2* | 6/2018 | Baum | G06F 16/2272 |
| 2003/0117940 | A1* | 6/2003 | Smallcomb | H04L 27/2662 370/208 |
| 2006/0173952 | A1* | 8/2006 | Coyle | H04J 3/0667 709/203 |
| 2011/0161402 | A1* | 6/2011 | Anderson | H04L 43/0817 709/203 |
| 2012/0147781 | A1 | 6/2012 | Li et al. | |
| 2013/0191481 | A1* | 7/2013 | Prevost | H04L 12/1859 709/206 |
| 2013/0208001 | A1* | 8/2013 | Lulue | G06F 17/30241 345/629 |
| 2013/0333009 | A1* | 12/2013 | Mackler | G06F 21/31 726/7 |
| 2015/0035823 | A1* | 2/2015 | Arsan | G06T 15/20 345/419 |
| 2015/0269968 | A1* | 9/2015 | Matejka | G11B 27/102 386/241 |
| 2016/0211985 | A1* | 7/2016 | Castillo | F24F 11/006 |

FOREIGN PATENT DOCUMENTS

| | | |
|---|---|---|
| JP | 2003242278 A | 8/2003 |
| JP | 2011071744 A | 4/2011 |
| JP | 2014119389 A | 6/2014 |

OTHER PUBLICATIONS

Roberts—Discovering Security Events of Interest Using Splunk—SANS 2013.*
Time Zones—1999—Balkus et al.*
Vizard—Splunk Serves Up Big Data Accessibility—2013.*
What does chronology mean—Definitions.net—2012.*
Dotson—Hadoop and Splunk Make Hunk a Cute Name for a Powerful Big Data Tool—siliconangle—Jun. 2013.*
Stopford—The Big Data Conundrum—benstopfords.com—Nov. 2012.*
World Intellectual Property Organization, Application No. PCT/CN14/90048, International Search Report dated Jul. 17, 2015.
World Intellectual Property Organization, Application No. PCT/CN14/90048, Pending Claims as of Jul. 17, 2015.

* cited by examiner

Original Search: 501
search "error | stats count BY host

Sent to peers: 502
search "error | prestats count BY host (map)

Executed by search head: 503
Merge prestats results received from peers (reduce)

AUTOMATICALLY ADJUSTING TIMESTAMPS FROM REMOTE SYSTEMS BASED ON TIME ZONE DIFFERENCES

CLAIM TO PRIORITY

This application is related to, and claims the benefit of PCT Patent Application No. PCT/CN2014/090048, filed Oct. 31, 2014, entitled "AUTOMATICALLY ADJUSTING TIMESTAMPS FROM REMOTE SYSTEMS BASED ON TIME ZONE DIFFERENCES", by inventors Lai Qiang Ding, et al., which is hereby incorporated by reference herein in its entirety.

BACKGROUND

Field

The disclosed embodiments relate to techniques for processing time-series data. More specifically, the disclosed embodiments relate to techniques for adjusting timestamps of time-series data from remote systems to account for time zone differences based on automatically identified time offsets of the remote systems.

Related Art

Organizations are increasingly relying on cloud-based computing systems to perform large-scale computational tasks. Such cloud-based computing systems are typically operated by hosting companies that maintain a sizable computational infrastructure, often comprising thousands of servers sited in geographically distributed data centers. Customers typically buy or lease computational resources from these hosting companies. The hosting companies in turn provision computational resources according to the customers' requirements and then enable the customers to access these resources.

Organizations further face the challenge of collecting and analyzing data from distributed cloud-computing environments. By performing "big data" analytics on logs, reports, errors, network data, and/or other monitored events in cloud-computing environments, the organizations may glean valuable insights that can be used to guide decisions and/or actions related to the data. For example, business analytics may facilitate the assessment of past performance, guiding of business planning, and/or identification of actions that may improve future performance. Similarly, time-stamped events in a distributed computing environment may be monitored to determine usage patterns of hardware or software resources and detect anomalies in the operation or use of the resources.

However, time-series data may be collected from remote computing environments located in multiple time zones. In addition, some or all of the time-series data may lack time zone information that can be used to normalize timestamps in the time-series data to a time standard such as Coordinated Universal Time (UTC). As a result, an administrator may be required to manually obtain the time zone for a given remote computing environment and create a system configuration that uses the time zone to adjust timestamps from the remote computing environment to conform to UTC or another time standard.

Consequently, collection and analysis of time-series data from remote computing environments may be facilitated by mechanisms for automatically standardizing timestamps from the remote computing environments.

SUMMARY

The disclosed embodiments provide a system that processes data received from a remote system. During operation, the system sends, from a computer system to a remote system, a request for a local time at the remote system and records a time of transmission of the request. Next, the system obtains, from the remote system, a response to the request, wherein the response includes the local time of the remote system. The system then computes a difference between the time of transmission and the local time of the remote system to determine a time offset that accounts for a time difference between the computer system and the remote system. Finally, the system uses the time offset to standardize timestamps in time-series data received from the remote system, wherein standardizing the timestamps associated with the time-series data includes adjusting the timestamps to conform to a time standard.

In some embodiments, the system also records a time of receipt of the response from the remote system, and uses the time of receipt to verify the time offset of the remote system.

In some embodiments, using the time of receipt to verify the time offset of the remote system includes using the time of receipt to verify that the response is received within a pre-specified period after the time of transmission.

In some embodiments, the system also uses the difference between the time of transmission and the local time of the remote system to automatically detect a change in the time offset.

In some embodiments, the change in the time offset is automatically detected by periodically transmitting the request to the remote system, and detecting the change in the time offset of the remote system from a change in the difference between the time of transmission of the request and the local time of the remote system.

In some embodiments, computing the difference between the time of transmission and the local time of the remote system to determine the time offset that accounts for the difference in time zones between the computer system and the remote system includes using an hour value of the difference between the time of transmission and the local time as an hour of the time offset.

In some embodiments, computing the difference between the time of transmission and the local time of the remote system to determine the time offset that accounts for the difference in time zones between the computer system and the remote system further includes calculating a minute of the time offset by rounding a minute value of the difference between the time of transmission and the local time of the remote system down to a nearest quarter hour.

In some embodiments, computing the difference between the time of transmission and the local time of the remote system to determine the time offset that accounts for the difference in time zones between the computer system and the remote system further includes verifying a receipt of the response from the remote system in less than a quarter hour after the time of transmission of the request to the remote system prior to calculating the minute of the time offset.

In some embodiments, the time-series data includes at least one of log data, network packet data, configuration data, message data, performance data, sensor data, and application data.

In some embodiments, searching of the time-series data using one or more extraction rules of the late-binding schema is performed using one or more extraction rules of a late-binding schema.

In some embodiments, using the time offset to standardize timestamps in time-series data received from the remote system includes associating standardized timestamps with the time-series data based on the timestamps associated with the time-series data and the time offset, and creating a set of events from the time-series data and the standardized timestamps.

In some embodiments, wherein adjusting the timestamps to conform to the time standard includes at least one of:
(i) adding the time offset to the timestamps;
(ii) converting the timestamps to the local time of the remote system;
(iii) converting the timestamps to a local system time of the computer system; and
(iv) converting the timestamps to timestamps using Coordinated Universal Time (UTC).

BRIEF DESCRIPTION OF THE FIGURES

FIG. 5 illustrates an exemplary search query received from a client and executed by search peers in accordance with the disclosed embodiments FIG. 6A illustrates a search screen in accordance with the disclosed embodiments.

FIG. 6B illustrates a data summary dialog that enables a user to select various data sources in accordance with the disclosed embodiments.

In the figures, like reference numerals refer to the same figure elements.

DETAILED DESCRIPTION

Figure 1:
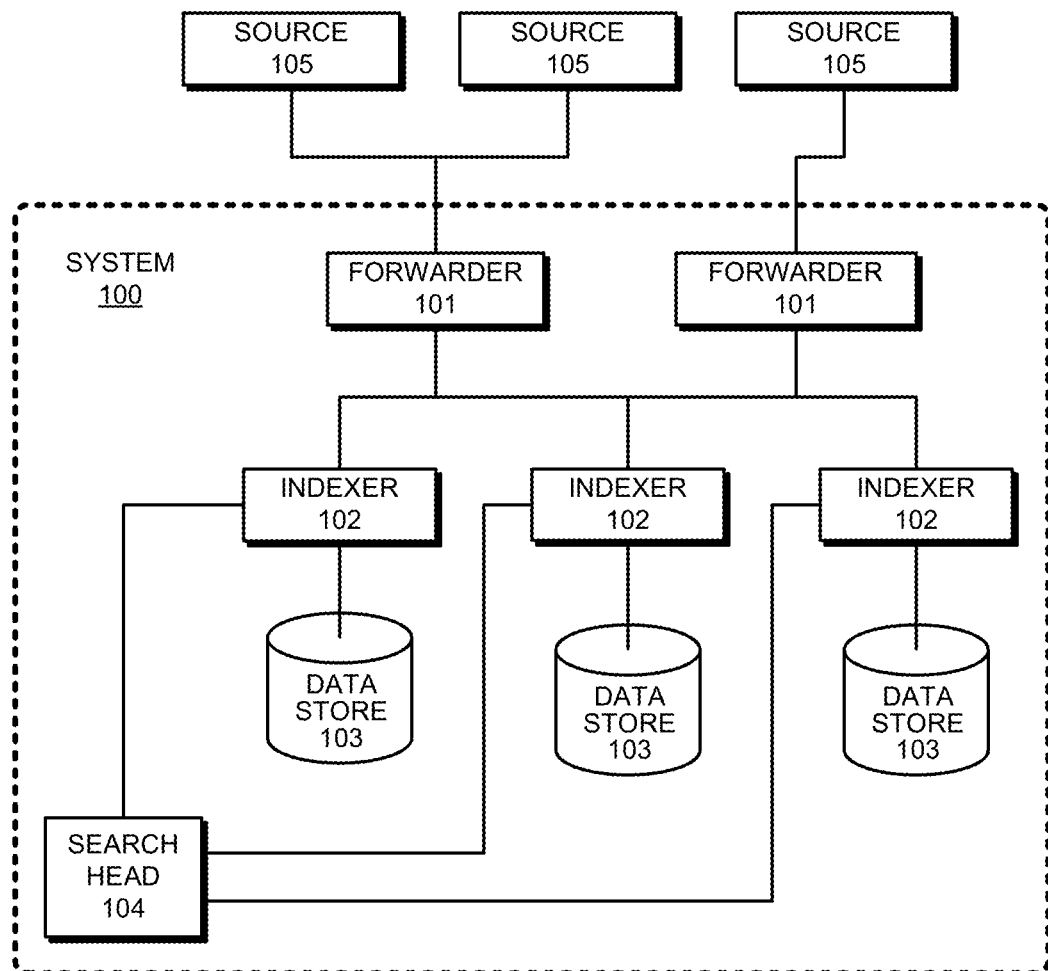
FIG. 1 shows a block diagram of an exemplary event-processing system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

1.1 Overview

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that was selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time-series data," wherein time-series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a predefined format. This means that unstructured data can comprise various data items having different data types that can reside at different locations. For example, when the data source is an operating system log, an event can include one or more lines from the operating system log containing raw data that includes different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time at which a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1.2 Data Server System

FIG. 1 shows a block diagram of an exemplary event-processing system 100, similar to the SPLUNK® ENTERPRISE system. System 100 includes one or more forwarders 101 that collect data obtained from a variety of different data sources 105, and one or more indexers 102 that store, process, and/or perform operations on this data, wherein each indexer operates on data contained in a specific data store 103. These forwarders and indexers can comprise separate computer systems in a data center, or may alternatively comprise separate processes executing on various computer systems in a data center.

During operation, forwarders 101 identify which indexers 102 will receive the collected data and then forward the data to the identified indexers. Forwarders 101 can also perform operations to strip out extraneous data and detect timestamps in the data. Forwarders 101 may next determine which indexers 102 will receive each data item and forward the data items to the determined indexers 102. Indexers 102 may then provide the data for storage in one or more data stores 103.

As mentioned above, the data may include streams, logs, database records, messages, archives, and/or other records containing time-series data. Time-series data refers to any data that can be associated with a time stamp. The data can be structured, unstructured, or semi-structured and come from files or directories. Unstructured data may include data, such as machine data and web logs, that is not organized to facilitate extraction of values for fields from the data.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 100 and the processes described below with respect to FIGS. 1-5 are further described in "Exploring Splunk Search Processing Language (SPL) Primer and Cookbook" by David Carasso, CITO Research, 2012, and in "Optimizing Data Analysis With a Semi-Structured Time-series Database" by Ledion Bitincka, Archana Ganapathi, Stephen Sorkin, and Steve Zhang, SLAML, 2010, each of which is hereby incorporated herein by reference in its entirety for all purposes.

1.3 Data Ingestion

Figure 2:
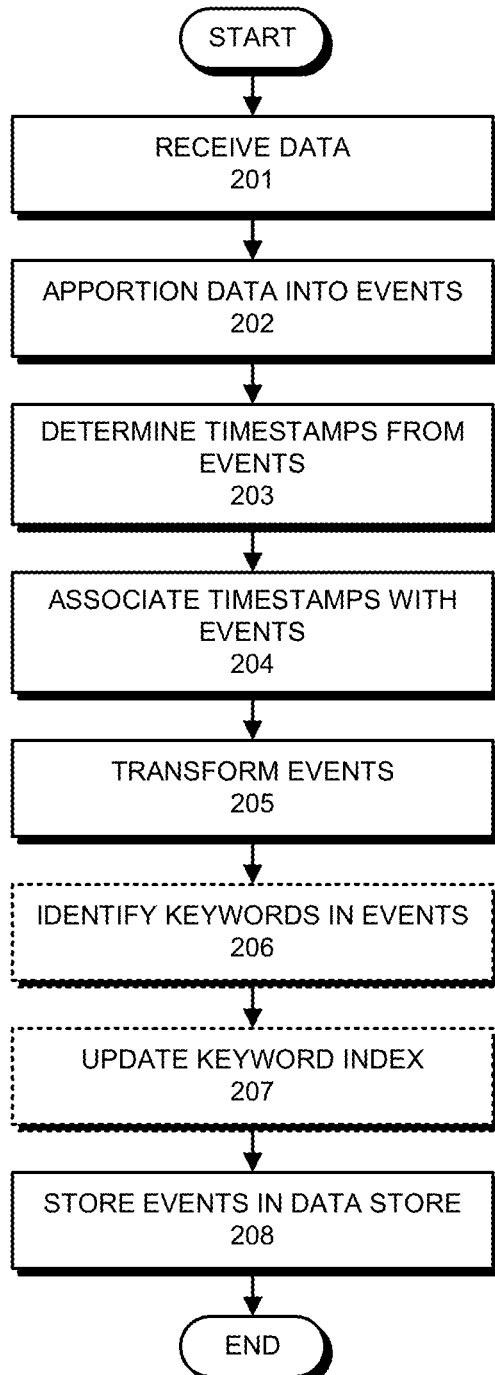
FIG. 2 presents a flowchart illustrating how indexers process, index, and store data received from forwarders in accordance with the disclosed embodiments.

FIG. 2 presents a flowchart illustrating how an indexer processes, indexes, and stores data received from forwarders in accordance with the disclosed embodiments. At block 201, the indexer receives the data from the forwarder. Next, at block 202, the indexer apportions the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces or line breaks. In some cases, a user can fine-tune or configure the rules that the indexers use to determine event boundaries in order to adapt the rules to the user's specific requirements.

Next, the indexer determines a timestamp for each event at block 203. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 204, for example by storing the timestamp as metadata for each event.

Then, the system can apply transformations to data to be included in events at block 205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in block 206. Then, at block 207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 102 is responsible for storing and searching a subset of the events contained in a corresponding data store 103. By distributing events among the indexers and data stores, the indexers can analyze events for a query in parallel, for example using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812 filed on 30 Apr. 2014, and in U.S. patent application Ser. No. 14/266,817 also filed on 30 Apr. 2014.

1.4 Query Processing

Figure 3:
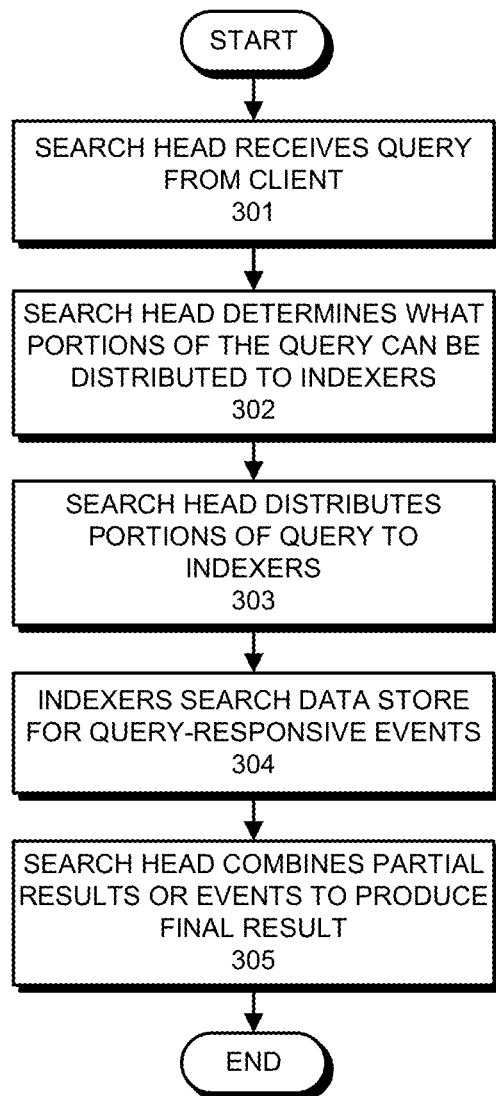
FIG. 3 presents a flowchart illustrating how a search head and indexers perform a search query in accordance with the disclosed embodiments.

FIG. 3 presents a flowchart illustrating how a search head and indexers perform a search query in accordance with the disclosed embodiments. At the start of this process, a search head receives a search query from a client at block 301. Next, at block 302, the search head analyzes the search query to determine what portions can be delegated to indexers and what portions need to be executed locally by the search head. At block 303, the search head distributes the determined portions of the query to the indexers. Note that commands that operate on single events can be trivially delegated to the indexers, while commands that involve events from multiple indexers are harder to delegate.

Then, at block 304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 304 may involve using the late-binding schema to extract values for specified fields from events at the time the query is processed. Next, the indexers can either send the relevant events back to the search head, or use the events to calculate a partial result, and send the partial result back to the search head.

Finally, at block 305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by system 100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these parameters to query the indexers to obtain a superset of the eventual results. Then, during a filtering stage, the search head can perform field-extraction operations on the superset to produce a reduced set of search results.

1.5 Field Extraction

Figure 4:
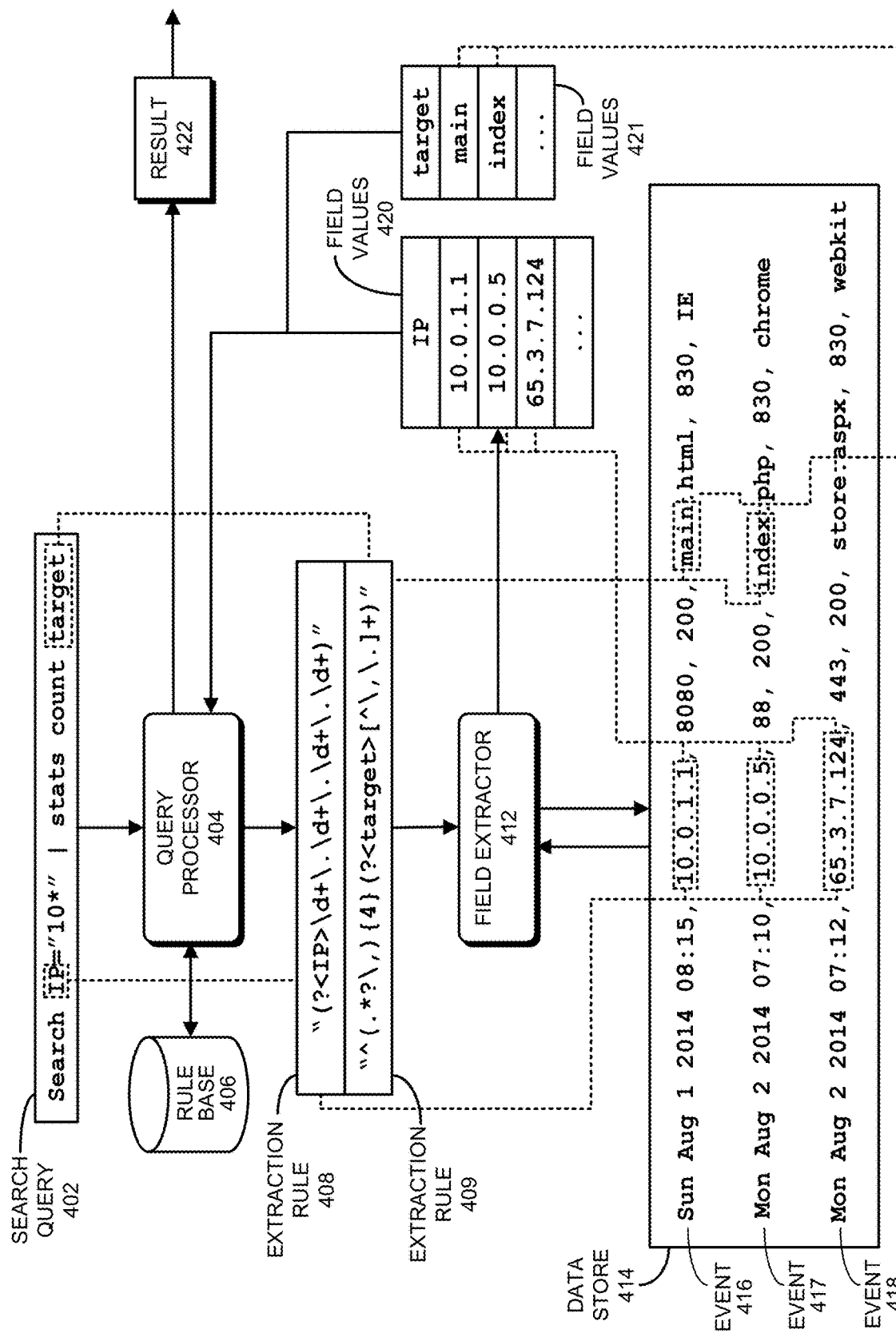
FIG. 4 presents a block diagram of a system for processing search requests that uses extraction rules for field values in accordance with the disclosed embodiments.

FIG. 4 presents a block diagram illustrating how fields can be extracted during query processing in accordance with the disclosed embodiments. At the start of this process, a search query 402 is received at a query processor 404. Query processor 404 includes various mechanisms for processing a query, wherein these mechanisms can reside in a search head 104 and/or an indexer 102. Note that the exemplary search query 402 illustrated in FIG. 4 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 402 can also be expressed in other query languages, such as the Structured Query Language ("SQL") or any suitable query language.

Upon receiving search query 402, query processor 404 sees that search query 402 includes two fields "IP" and "target." Query processor 404 also determines that the values for the "IP" and "target" fields have not already been extracted from events in data store 414, and consequently determines that query processor 404 needs to use extraction rules to extract values for the fields. Hence, query processor 404 performs a lookup for the extraction rules in a rule base 406, wherein rule base 406 maps field names to corresponding extraction rules and obtains extraction rules 408-409, wherein extraction rule 408 specifies how to extract a value for the "IP" field from an event, and extraction rule 409 specifies how to extract a value for the "target" field from an event. As is illustrated in FIG. 4, extraction rules 408-409 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 404 sends extraction rules 408-409 to a field extractor 412, which applies extraction rules 408-409 to events 416-418 in a data store 414. Note that data store 414 can include one or more data stores, and extraction rules 408-409 can be applied to large numbers of events in data store 414, and are not meant to be limited to the three events 416-418 illustrated in FIG. 4. Moreover, the query processor 404 can instruct field extractor 412 to apply the extraction rules to all the events in a data store 414, or to a subset of the events that have been filtered based on some criteria.

Next, field extractor 412 applies extraction rule 408 for the first command "Search IP="10*"" to events in data store 414 including events 416-418. Extraction rule 408 is used to extract values for the IP address field from events in data store 414 by looking for a pattern of one or more digits, followed by a period, followed again by one or more digits, followed by another period, followed again by one or more digits, followed by another period, and followed again by one or more digits. Next, field extractor 412 returns field values 420 to query processor 404, which uses the criterion IP="10*" to look for IP addresses that start with "10". Note that events 416 and 417 match this criterion, but event 418 does not, so the result set for the first command is events 416-417.

Query processor 404 then sends events 416-417 to the next command "stats count target." To process this command, query processor 404 causes field extractor 412 to apply extraction rule 409 to events 416-417. Extraction rule 409 is used to extract values for the target field for events 416-417 by skipping the first four commas in events 416-417, and then extracting all of the following characters until a comma or period is reached. Next, field extractor 412 returns field values 421 to query processor 404, which executes the command "stats count target" to count the number of unique values contained in the target fields, which in this example produces the value "2" that is returned as a final result 422 for the query.

Note that query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or chart, generated from the values.

1.6 Exemplary Search Screen

Figure 6A:
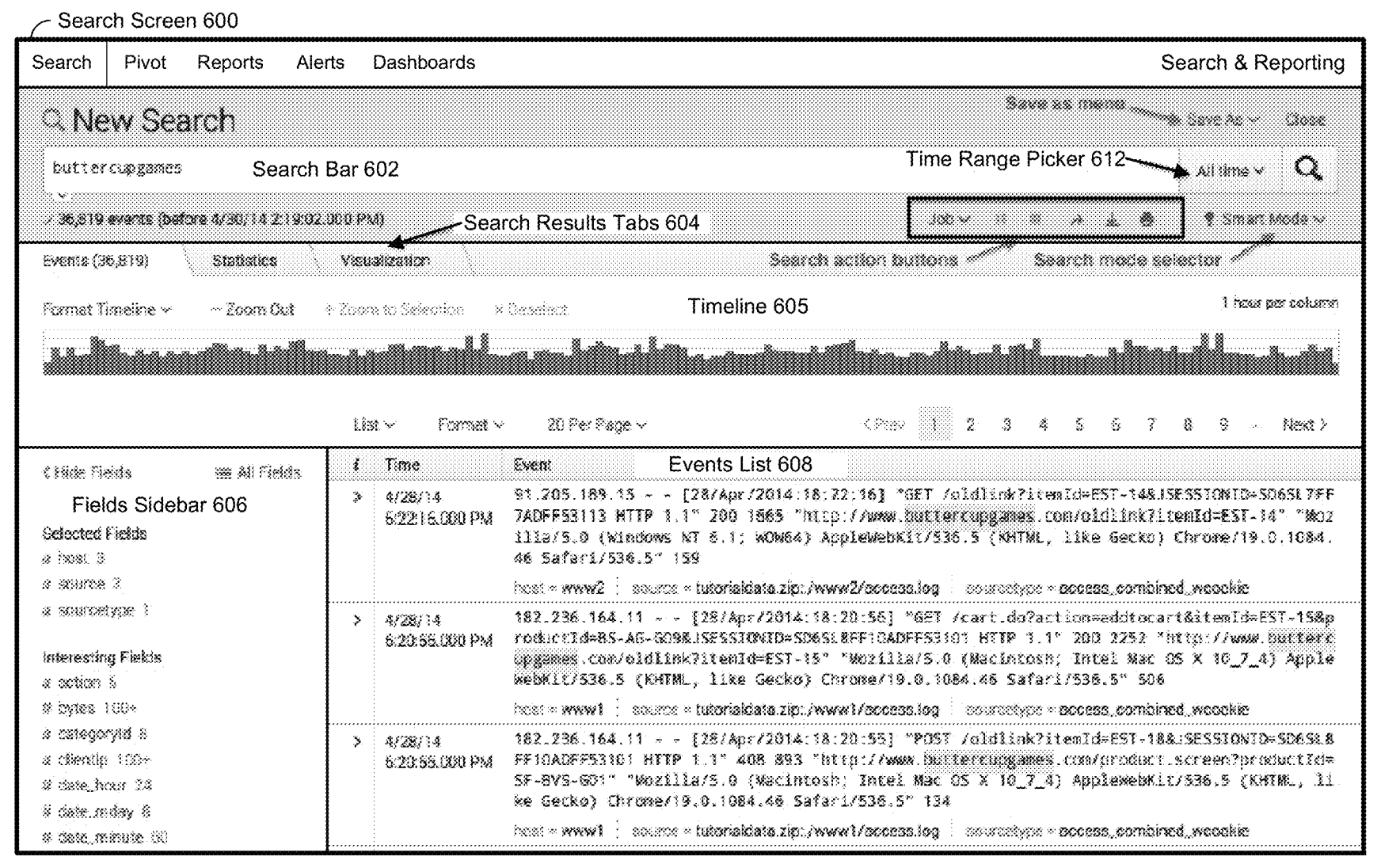
Figure 6B:
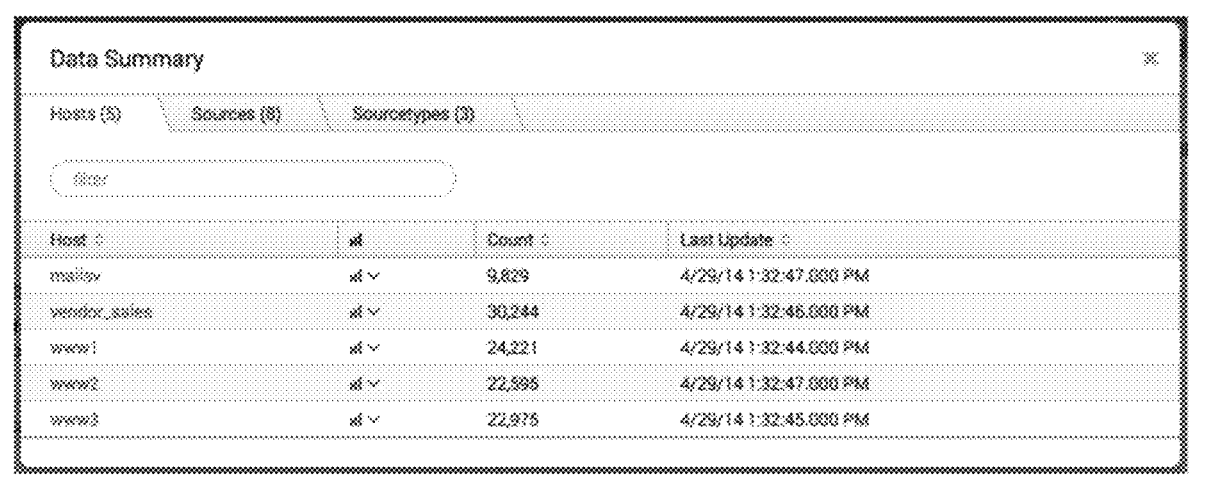

FIG. 6A illustrates an exemplary search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, for example by selecting specific hosts and log files.

After the search is executed, the search screen 600 can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

1.7 Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

1.7.1 Map-Reduce Technique

To facilitate faster query processing, a query can be structured as a map-reduce computation, wherein the "map" operations are delegated to the indexers, while the corresponding "reduce" operations are performed locally at the search head. For example, FIG. 5 illustrates how a search query 501 received from a client at search head 104 can split into two phases, including: (1) a "map phase" comprising subtasks 502 (e.g., data retrieval or simple filtering) that may be performed in parallel and are "mapped" to indexers 102 for execution, and (2) a "reduce phase" comprising a merging operation 503 to be executed by the search head when the results are ultimately collected from the indexers.

During operation, upon receiving search query 501, search head 104 modifies search query 501 by substituting "stats" with "prestats" to produce search query 502, and then distributes search query 502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 3, or may alternatively distribute a modified version (e.g., a more restricted version) of the search query to the search peers. In this example, the indexers are responsible for producing the results and sending them to the search head. After the indexers return the results to the search head, the search head performs the merging operations 503 on the results. Note that by executing the computation in this way, the system effectively distributes the computational operations while minimizing data transfers.

1.7.2 Keyword Index

As described above with reference to the flow charts in FIGS. 2 and 3, event-processing system 100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

1.7.3 High Performance Analytics Store

To speed up certain types of queries, some embodiments of system 100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

1.7.4 Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated on the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011.

1.8 Security Features

The SPLUNK® ENTERPRISE platform provides various schemas, dashboards and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. (The process of detecting security threats for network-related information is further described in U.S. patent application Ser. Nos. 13/956,252, and 13/956,262.) Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 7A:
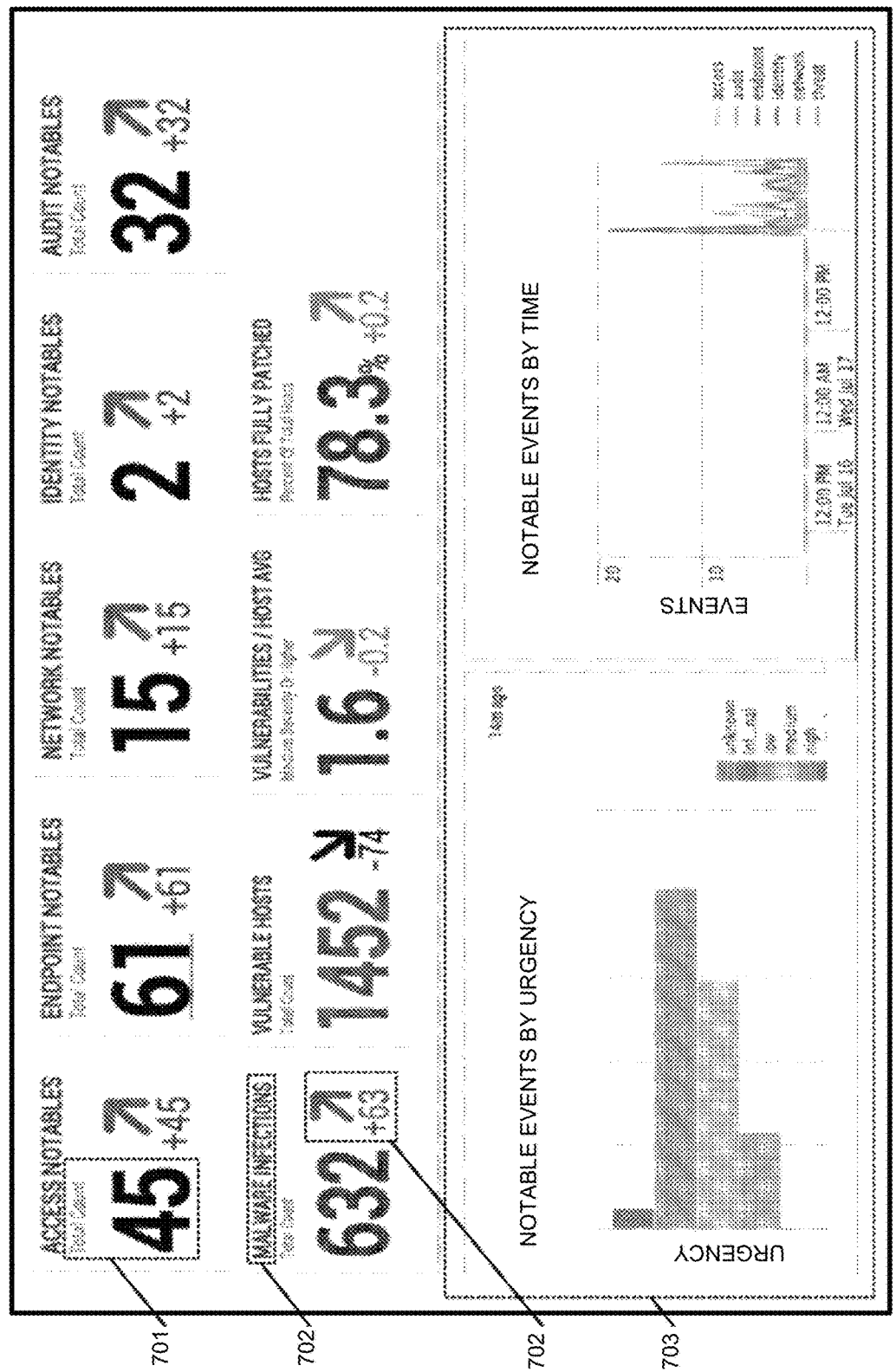
FIG. 7A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 7A illustrates an exemplary key indicators view 700 that comprises a dashboard, which can display a value 701, for various security-related metrics, such as malware infections 702. It can also display a change in a metric value 703, which indicates that the number of malware infections increased by 63 during the preceding interval. Key indicators view 700 additionally displays a histogram panel 704 that displays a histogram of notable events organized by urgency values, and a histogram of notable events organized by time intervals. This key indicators view is described in further detail in pending U.S. patent application Ser. No. 13/956,338 filed Jul. 31, 2013.

Figure 7B:
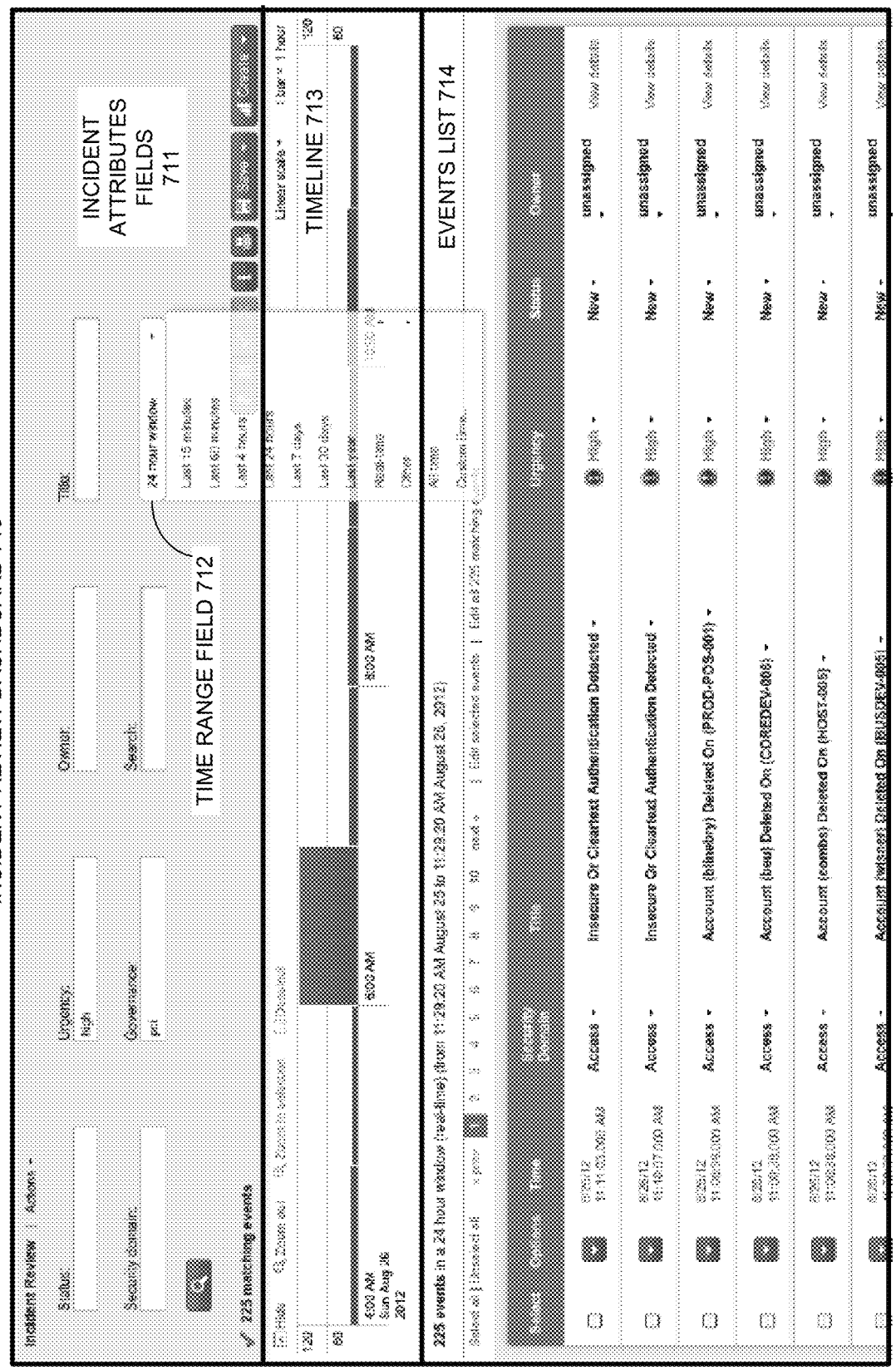
FIG. 7B illustrates an incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 7B illustrates an exemplary incident review dashboard 710 that includes a set of incident attribute fields 711 that, for example, enables a user to specify a time range field 712 for the displayed events. It also includes a timeline 713 that graphically illustrates the number of incidents that occurred in one-hour time intervals over the selected time range. It additionally displays an events list 714 that enables a user to view a list of all of the notable events that match the criteria in the incident attributes fields 711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in "http://docs.splunk.com/Documentation/PCI/2.1.1/User/IncidentReviewdashboard."

1.9 Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent Ser. No. 14/167,316 filed 29 Jan. 2014, which is hereby incorporated herein by reference. Also, see "vSphere Monitoring and Performance," Update 1, vSphere 5.5, EN-001357-00, http://pubs.vmware.com/vsphere-55/topic/com.vmware.ICbase/PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

Figure 7C:
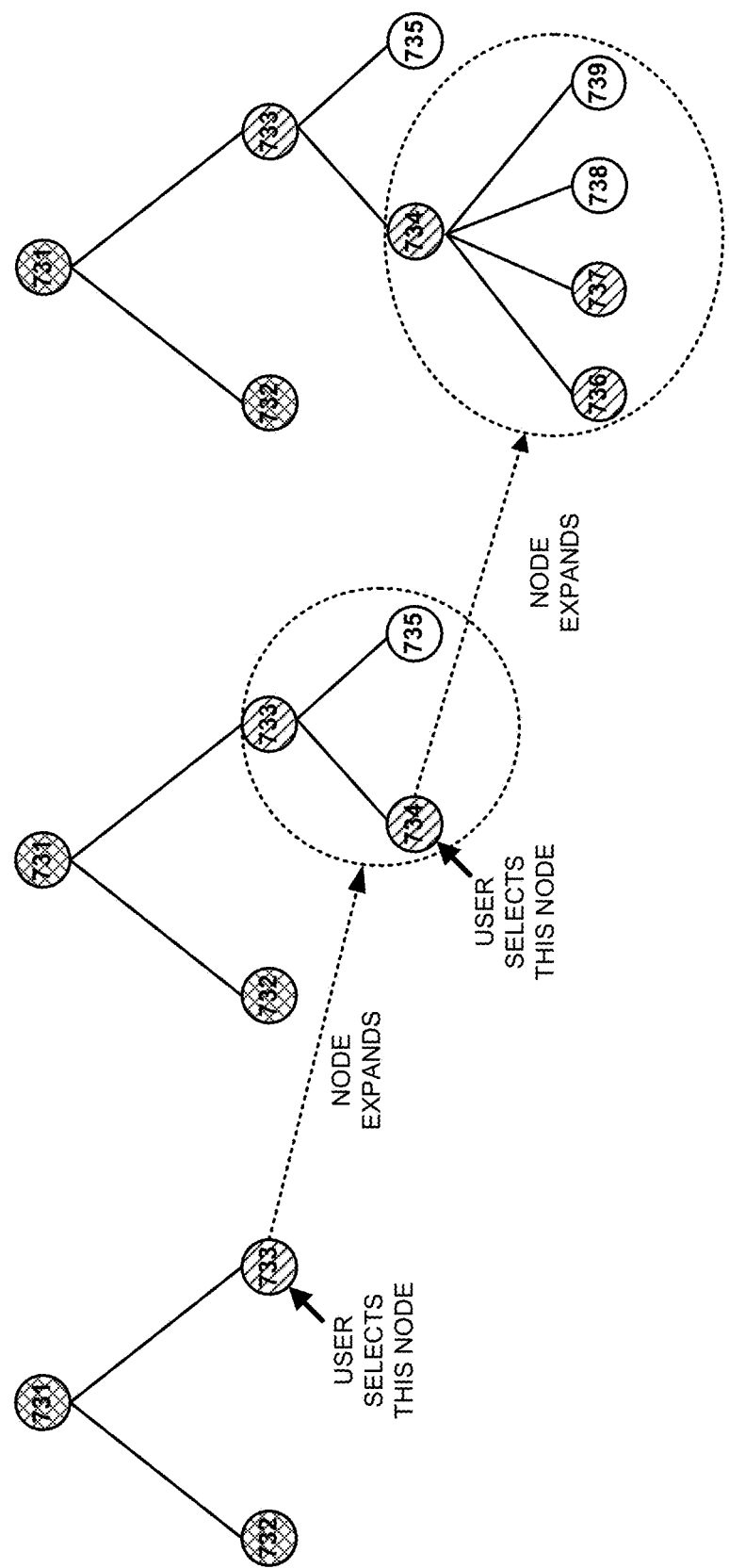
FIG. 7C illustrates a proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 7C, wherein nodes 733 and 734 are selectively expanded. Note that nodes 731-739 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on 15 Apr. 2014, which is hereby incorporated herein by reference for all possible purposes.

Figure 7D:
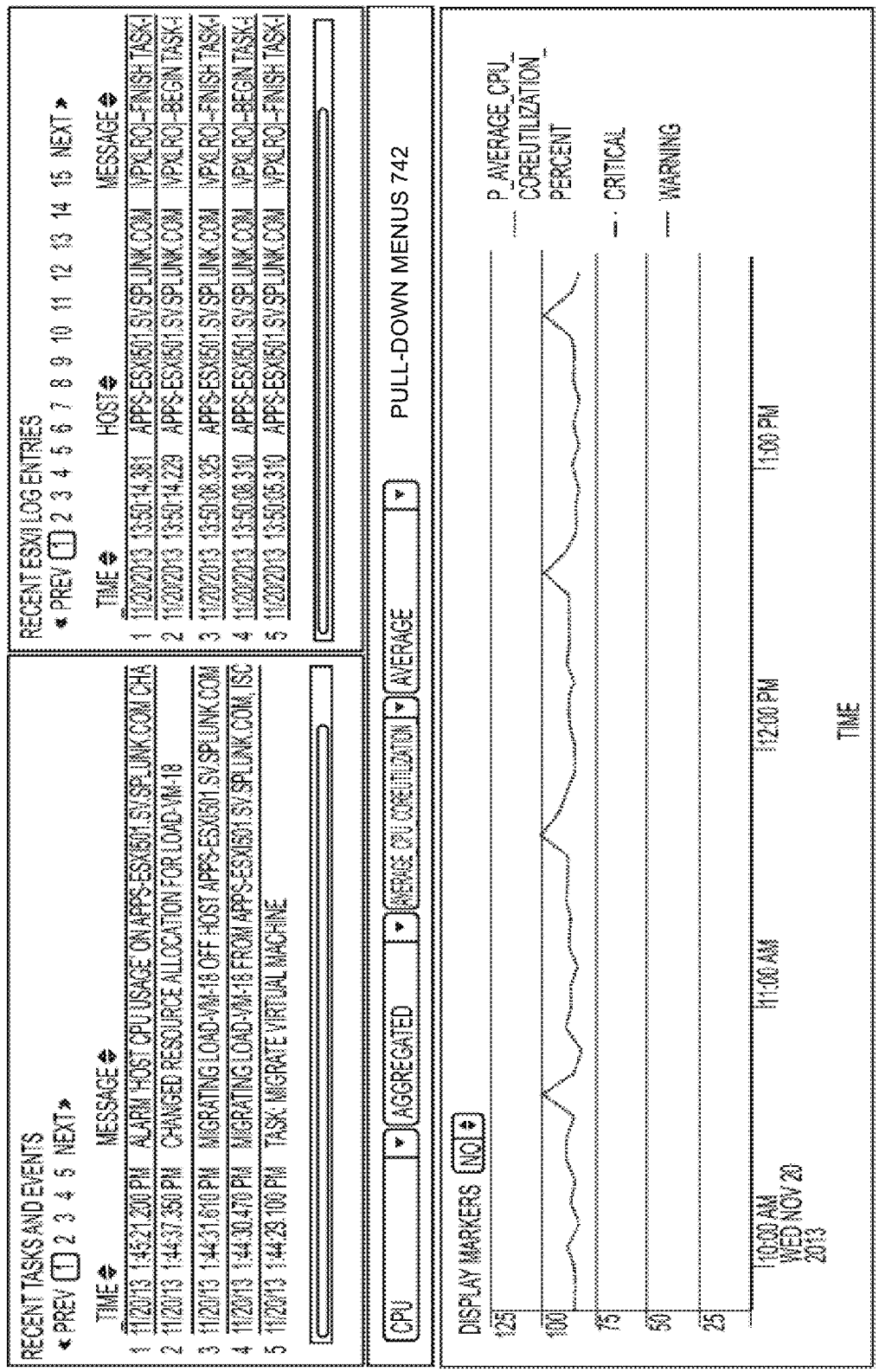
FIG. 7D illustrates a screen displaying both log data and performance data in accordance with the disclosed embodiments.

The SPLUNK® APP FOR VMWARE® also provides a user interface that enables a user to select a specific time range and then view heterogeneous data, comprising events, log data and associated performance metrics, for the selected time range. For example, the screen illustrated in FIG. 7D displays a listing of recent "tasks and events" and a listing of recent "log entries" for a selected time range above a performance-metric graph for "average CPU core utilization" for the selected time range. Note that a user is able to operate pull-down menus 742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on 29 Jan. 2014, which is hereby incorporated herein by reference for all possible purposes.

2.1 Automatic Adjustment of Remote System Timestamps

Those skilled in the art will appreciate that an event-processing system such as system 100 of FIG. 1 may collect time-series data from multiple geographically distributed sources (e.g., sources 105 of FIG. 1). For example, the sources may include remote servers, databases, storage devices, network devices, mobile devices, sensors, and/or applications that are located in different cities, states, countries, continents, and/or time zones. Moreover, some or all of the time-series data from the sources may include timestamps that lack time zone or time offset information that can be used to standardize the timestamps. For example, an event may include a timestamp such as "2014-09-30 10:00 am." Because the timestamp lacks a time zone or a time offset from Coordinated Universal Time (UTC), the timestamp may represent one of 40 possible time offsets that vary from 12 hours earlier than UTC to 14 hours later than UTC. The time offsets may additionally differ from UTC in quarter-hour increments and/or include minor differences in local system times of various remote sources. Consequently, an administrator may be required to manually obtain the time zone for a given remote source and configure the event-processing system to use the time zone to convert timestamps from the source into a standardized time.

Figure 8:
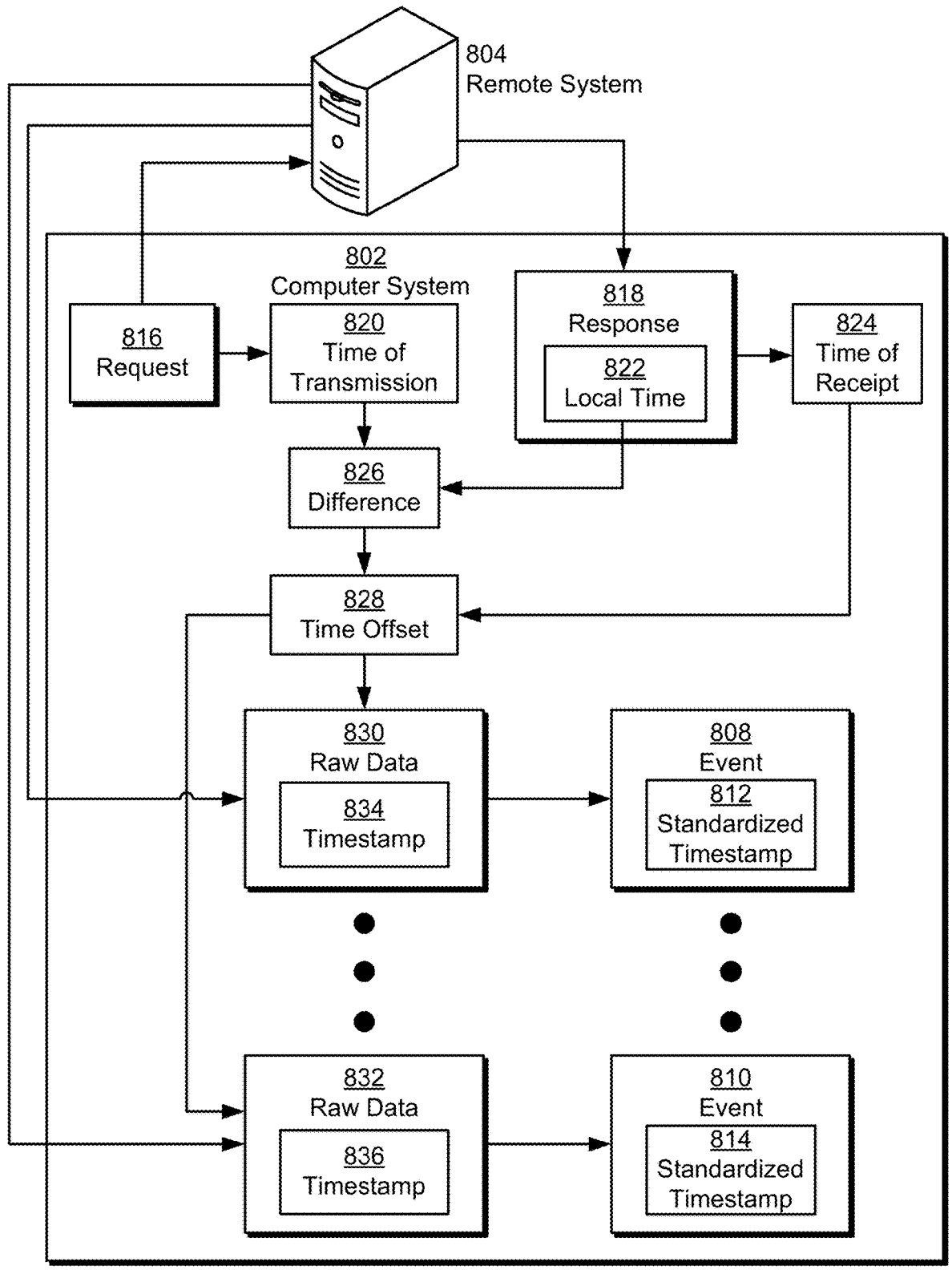
FIG. 8 shows a system for processing data in accordance with the disclosed embodiments.

The disclosed embodiments provide a method and system for automatically identifying the time offsets of remote sources and using the time offsets to standardize timestamps of time-series data from the remote source. As shown in FIG. 8, a computer system 802 may collect raw data 830-832 from a remote system 804. For example, computer system 802 may be a component of an event-processing system such as system 100 of FIG. 1, and remote system 804 may be a source (e.g., sources 105 of FIG. 1) of raw data 830-832 (e.g., time-series data) that is collected, stored, and/or processed by computer system 802 and/or other components of the event-processing system.

Computer system 802 may use one or more application-programming interfaces (APIs) with remote system 804 to obtain one or more event streams, logs, reports, messages, archives, database records, and/or other records of Information Technology (IT) activity monitored on remote system 804. For example, computer system 802 may use one or more APIs to communicate with a storage device, network device, server, database, filesystem, and/or other remote system 804 that is external to the event-processing system and obtain logs of timestamped IT data from remote system 804.

Next, computer system 802 may obtain raw data 830-832 from remote system 804 and transform raw data 830-832 into a series of events 808-810. For example, computer system 802 may create events 808-810 from time-series raw data 830 in a log, message, archive, database record, stream, and/or other record of activity on remote system 804 and associate standardized timestamps 812-814 with events 808-810 using timestamps 834-836 and/or other time information in raw data 830-832. Computer system 802 and/or another component of the event-processing system may then index events 808-810, perform additional transformations of events 808-810, store events 808-810, and/or enable searching of events 808-810.

As mentioned above, timestamps 834-836 associated with raw data 830-832 collected from remote system 804 may lack information that can be used to create standardized timestamps 812-814 associated with events 808-810 generated from raw data 830-832. For example, computer system 802 may use an API with remote system 804 to obtain raw data 830-832 containing timestamps 834-836 that lack time zone or time offset information. To reduce manual work performed by an administrator to identify the time zone of remote system 804 and configure computer system 802 to standardize timestamps 834-836 in raw data 830-832 using the time zone, computer system 802 may automatically identify a time offset 828 of remote system 804 and use time offset 828 to standardize timestamps 834-836 before including the timestamps as standardized timestamps 812-814 that are associated with events 808-810.

First, computer system 802 may transmit a request 816 for the local time 822 at remote system 804 to remote system 804. For example, computer system 802 may use an API to transmit a control command to remote system 804 that requests the current date and time of remote system 804. Computer system 802 may also record a time of transmission 820 of request 816. For example, computer system 802 may record time of transmission 820 as the current local system time of computer system 802, along with the time zone of computer system 802 and/or the time offset of the local system time from UTC.

Next, computer system 802 may receive a response 818 to request 816 from remote system 804 and obtain local time 822 of remote system 804 from response 818. As mentioned above, local time 822 may lack time zone or time offset information for remote system 804. For example, local time 822 may include only the system date, system time, and/or day of the week on remote system 804. Upon receiving response 818, computer system 802 may record a time of receipt 824 of response 818. As with time of transmission 820, time of receipt 824 may be recorded using the local system time of computer system 802, along with the time zone and/or time offset of computer system 802.

Computer system 802 may calculate a difference 826 between time of transmission 820 of request 816 and local time 822 of remote system 804 and use difference 826 to determine time offset 828 that accounts for the difference in time zones between computer system 802 and remote system 804. For example, computer system 802 may compute difference 826 by subtracting local time 822 from time of transmission 820 and use the hour value of difference 826 as the hour of time offset 828. To obtain the minute of time offset 828, computer system 802 may round the minute value of difference 826 down to the nearest quarter hour. Computer system 802 may thus be capable of detecting local time 822 on remote system 804 that is a number of whole hours and/or a number of quarter hours offset from UTC and/or the time zone of computer system 804.

After time offset 828 is determined, computer system 802 may use time offset 828 to standardize timestamps 834-836 in raw data 830-832 received from remote system 804. For example, computer system 802 may associate standardized timestamps 812-814 with raw data 830-832 based on timestamps 834-836 associated with raw data 830-832 and time offset 828. Next, computer system 802 may create events 808-810 from raw data 830-832 and standardized timestamps 812-814. After events 808-810 are created, events 808-810 may be stored, indexed, processed, and/or made available for search by computer system 802 and/or another component of the event-processing system.

To standardize timestamps 834-836, computer system 802 may copy timestamps 834-836 to events 808-810 and add time offset 828 to the timestamps, or computer system 802 may use time offset 828 to convert timestamps 834-836 to absolute timestamps that use UTC before using the absolute timestamps as timestamps 812-814 associated with events 808-810. For example, computer system 802 may standardize a timestamp of "2014-09-30 10:00 am" with a time offset of UTC+8:00 by adding the time offset to the timestamp to obtain "2014-09-30 10:00 am UTC+8:00." Alternatively, computer system 802 may standardize the timestamp by converting the timestamp to the absolute timestamp of "2014-09-30 02:00 UTC."

Computer system 802 may also standardize timestamps 834-836 according to local time 822 of remote system 804 and/or the local system time of computer system 802. For example, computer system 802 may use time offset 828 to convert timestamps 834-836 to the time zone of computer system 802, with or without including the time zone of computer system 802 in the converted timestamps. In another example, computer system 802 may use local time 822 as the time standard for timestamps from computer system 802 and/or other remote systems and use time offset 828 to convert timestamps from time-series data on computer system 802 and/or the other remote systems to conform to local time 822.

In addition, computer system 802 may use time offset 828 to accommodate for differences in the days, weeks, months, and/or years of local time 822 of remote system 804 and the local system time of computer system 802. For example, if time offset 828 of remote system 804 is determined to be four hours ahead of the local system time of computer system 802, a timestamp of "2014-01-01 2:00 am" may be converted to the local system time of computer system 802 to obtain a standardized timestamp of "2013-12-31 10:00 pm" in the time zone of computer system 802.

Computer system 802 may also verify the calculated time offset 828 of remote system 804 using time of receipt 824. More specifically, computer system 802 may use time of receipt 824 to verify that response 818 is received within a pre-specified period after time of transmission 820. Consequently, time of receipt 824 may be used to establish an upper bound on the amount of time that can pass between time of transmission 820 and processing of request 816 by remote system 804. In turn, the upper bound may prevent the passage of time between time of transmission 820 and the time at which local time 822 is included in response 818 from skewing the calculation of time offset 828 of remote system 804.

For example, computer system 802 may subtract time of transmission 820 from time of receipt 824 to obtain the number of seconds and/or minutes that have elapsed between the transmission of request 816 and the receipt of response 818. If the time span between time of transmission 820 and time of receipt 824 is smaller than a time threshold (e.g., 15 minutes), computer system 802 may use local time 822 to determine time offset 828 and standardize timestamps 812-814 in time-series data 806 based on time offset 828. If the time span between time of transmission 820 and time of receipt 824 is greater than the time threshold, computer system 802 may determine that local time 822 in response 818 is not accurate enough to calculate difference 826 and time offset 828. Instead, computer system 802 may continually retransmit request 816 to remote system 804 until response 818 is received within the time threshold after the retransmitted request 816.

In another example, computer system 802 may detect and account for slight variations between local time 822 of remote system 804 and the local system time of computer system 802, independently of differences in time zone or time offset 828 between computer system 802 and remote system 804. For example, computer system 802 may identify a difference of a few minutes between local time 822 and the local system time of computer system 802 by receiving response 818 within a minute of transmitting request 816. Any deviation of more than a minute between local time 822 in response 818 and the local system time of computer system 802 may then be used to correct for a small difference in the system clocks of computer system 802 and remote system 804. Consequently, the pre-specified period within which response 818 must be received after request 816 is sent may be adjusted to accommodate the detection of different types of time differences between computer system 802 and remote system 804.

While computer system 802 attempts to accurately determine time offset 828 from request 816 and a timely received response 818, computer system 802 may continue to generate events 808-810 from raw data 830-832 (e.g., as raw data 830-832 is generated on remote system 804). To improve the accuracy of non-standardized timestamps in events 808-810 before time offset 828 is established, computer system 802 may tag the non-standardized timestamps before time-series data 806 is stored or indexed to indicate that the non-standardized timestamps are based on local time 822 instead of a time standard used by computer system 802. Once time offset 828 is determined, computer system 802 and/or another component of the event-processing system may use time offset 828 to convert the tagged timestamps during a subsequent retrieval of time-series data 806 containing the tagged timestamps so that the retrieved time-series data 806 conforms to the same time standard as other time-series data from remote system 804 and/or other remote systems.

To facilitate tracking and/or additional verification of time offset 828, computer system 802 may periodically transmit request 816 to remote system 804 and update time offset 828 based on the value of local time 822 in response 818 that is received after each transmitted request 816. For example, computer system 802 may transmit request 816 to remote system 804 every hour or half hour and use difference 826 between local time 822 in each response 818 to request 816 to update and/or verify time offset 828.

By repeatedly calculating difference 826 and determining time offset 828 from difference 826, computer system 802 may automatically detect a change in time offset 828 as a change in difference 826 between time of transmission 820 and local time 822. For example, computer system 802 may use repeated calculations of difference 826 to detect a change in time offset 828 that is caused by daylight saving time (DST) and/or other another clock shift. Such automatic detection of changes in time offset 828 may further reduce the amount of overhead and/or manual work required to generate standardized timestamps 812-814 from timestamps 834-836 and/or other time information associated with raw data 830-832. For example, automatic detection of a DST clock shift on remote system 804 by computer system 802 may avert the manual configuration of computer system 802 (e.g., by an administrator) that is otherwise required to adjust the standardization of timestamps from remote system 804 to accommodate the DST clock shift.

Detection of changes in time offset 828 may additionally be facilitated by varying the frequency with which time offset 828 is updated. For example, computer system 802 may be configured (e.g., by default or by an administrator) to update time offset 828 on a daily basis when clock shifts are not expected (e.g., most days of the year) and on an hourly or half-hourly basis when clock shifts are expected (e.g., within two hours of an expected clock shift). As a result, standardized timestamps 812-814 may more accurately reflect the clock shifts, which may improve correlation of events (e.g., events 808-810) from multiple remote systems along the same time standard.

Figure 9:
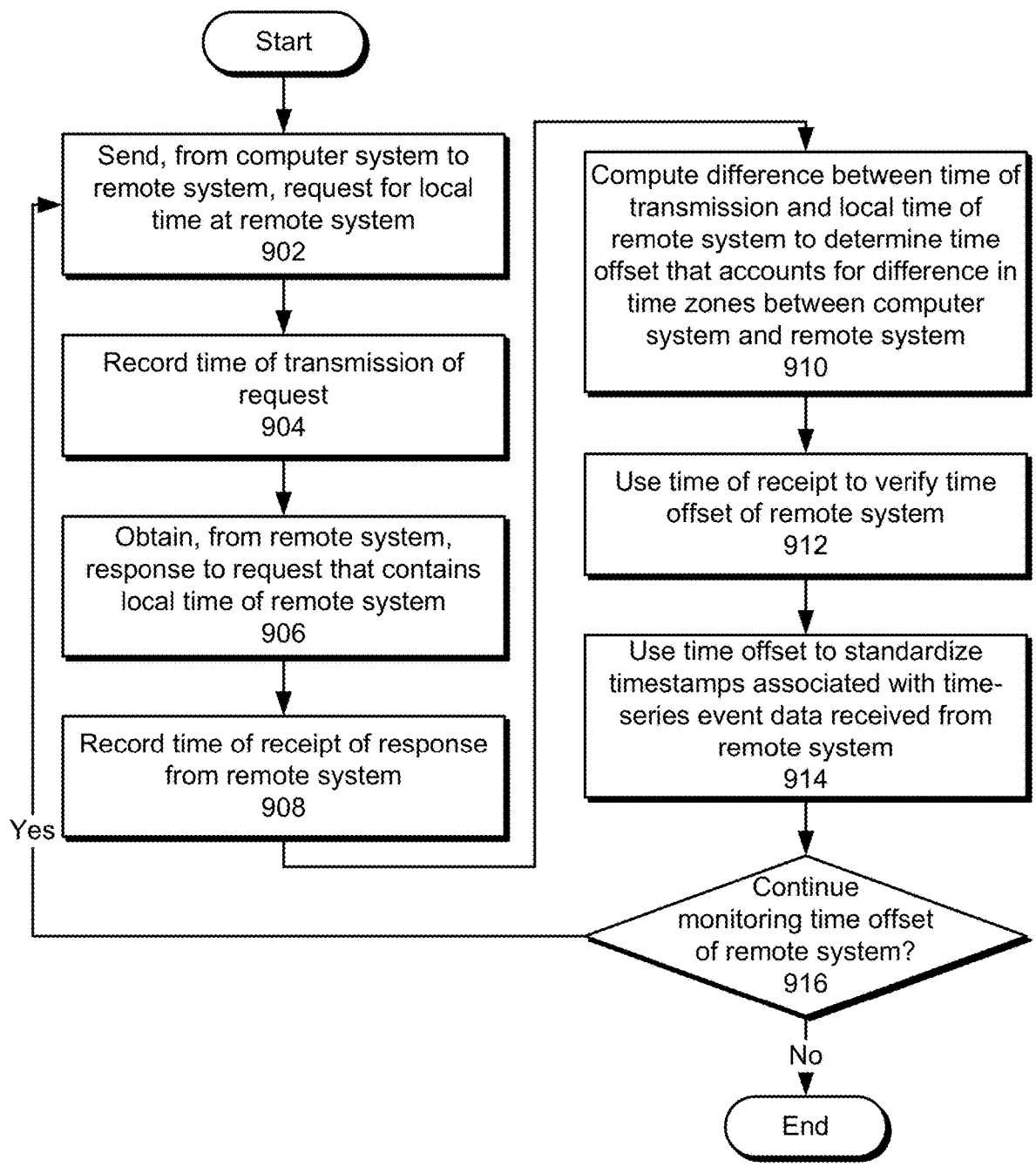
FIG. 9 shows a flowchart illustrating the processing of data in accordance with the disclosed embodiments.

FIG. 9 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 9 should not be construed as limiting the scope of the embodiments.

Initially, a request for a local time at a remote system is sent from a computer system to the remote system (operation 902). For example, the computer system may send the request using an API with the remote system. A time of transmission of the request is also recorded (operation 904) at the computer system. For example, the time of transmission of the request may recorded as the local system time from the operating system of the computer system at the time at which the request was transmitted. The time of transmission may include the date, time, and time zone or time offset of the computer system.

Next, a response to the request that contains the local time of the remote system is obtained from the remote system (operation 906), and the time of receipt of the response is recorded (operation 908). As with recordation of the time of transmission of the request, the time of receipt of the response may be recorded as the local system time of the operating system on the computer system at the time at which the response was received. The time of receipt may additionally include the date, time, and time zone or time offset of the computer system.

A difference between the time of transmission and the local time of the remote system is also computed to determine a time offset that accounts for the difference in time zones between the computer system and the remote system (operation 910), and the time of receipt is used to verify the time offset (operation 912). For example, the difference between the time of transmission and the local time of the remote system may be used to calculate a time offset from UTC for the remote system. Similarly, the time of receipt may be used to ensure that the time offset is calculated accurately from the difference between the time of transmission and the local time of the remote system. Determining and verifying time offsets of remote systems is described in further detail below with respect to FIG. 10.

Finally, the time offset is used to standardize timestamps in time-series data received from the remote system (operation 914). For example, a standardized timestamp may be associated with the time-series data based on the time offset and a timestamp associated with the event from the time-series data, and the event may be generated from the time-series data and the standardized timestamp. To generate a standardized timestamp from the timestamp in the raw data, the timestamp associated with the raw data may be adjusted to conform to a time standard. For example, the time offset may be added to the timestamp, used to convert the timestamp into an absolute timestamp (e.g., a timestamp using UTC), and/or used to convert the timestamp into the local time of the remote system or the local system time of the computer system.

The time offset of the remote system may continue to be monitored (operation 916) during collection and/or generation of events using raw data from the remote system. If the time offset is to be monitored, a request for the local time at the remote system may periodically be sent from the computer system to the remote system (operation 902), and the time of transmission of the request may be recorded (operation 904). A response to the request that contains the local time of the remote system may then be used to determine and verify the time offset of the remote system (operations 906-912) and standardize timestamps associated with time-series data from the remote system (operation 314).

Moreover, the difference between the time of transmission and the local time of the remote system may be used to automatically detect a change in the time offset of the remote system. In particular, periodic transmission of the request and receipt of the response may enable the automatic detection of the change in the time offset from a change in the difference between the time of transmission of the request and the local time of the remote system. For example, hourly or half-hourly determination of the time offset may facilitate the detection of a change in the time offset that is caused by a DST clock shift on the remote system. Such periodic assessment of the time offset may thus be performed until time-series data is no longer collected and/or generated using the remote system.

Figure 10:
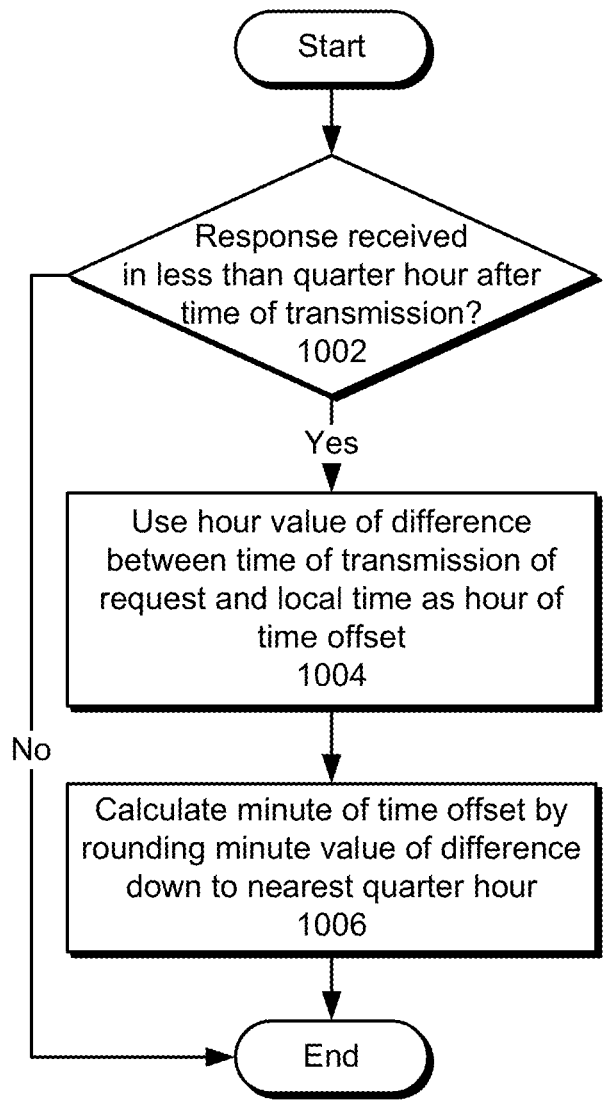
FIG. 10 shows a flowchart illustrating the process of determining a time offset that accounts for the difference in time zones between a computer system and a remote system in accordance with the disclosed embodiments.

FIG. 10 shows a flowchart illustrating the process of determining a time offset that accounts for the difference in time zones between a computer system and a remote system in accordance with the disclosed embodiments. In one or more embodiments, one or more of the steps may be omitted, repeated, and/or performed in a different order. Accordingly, the specific arrangement of steps shown in FIG. 10 should not be construed as limiting the scope of the embodiments.

As described above, determination of the time offset may be verified using the time of receipt of a response to a request for the local time of the remote system. More specifically, the time of receipt may be used to verify that the response was received in less than a quarter hour after the time of transmission (operation 1002) of the request. The bound on the amount of time spanned between the time of transmission and the time of receipt may facilitate the accurate calculation of the time offset from the local time of the remote system, as obtained from the response. For example, the 15-minute limit on the receipt of the response after the time of transmission of the request may ensure that the local time of the remote system in the response does not differ by more than 15 minutes from the local time of the remote system at the time of transmission. If the response is not received in less than a quarter hour after the time of transmission, the time offset is not determined using the local time in the response. Instead, the request may be retransmitted, and the time offset may be determined using a subsequent response to the request that is received within 15 minutes of transmission of the request.

If the response is received within a quarter hour of the time of transmission, the time offset may be determined using a difference between the time of transmission of the request and the local time of the remote system, as provided in the response. First, an hour value of the difference between the time of transmission of the request and the local time is used as the hour of the time offset (operation 1004).

For example, the difference between the time of transmission and the local time may be calculated by subtracting the local time from the time of transmission or, conversely, by subtracting the time of transmission from the local time. If the time of transmission is in UTC, the hour value of the difference may be used as the hour of the time offset from UTC. If the time of transmission is in a time zone that is defined relative to UTC, the hour value of the difference may be added to the time zone (e.g., if the difference is calculated by subtracting the time of transmission from the local time) or subtracted from the time zone (e.g., if the difference is calculated by subtracting the local time from the time of transmission) to obtain the hour of the time offset.

Second, the minute of the time offset is calculated by rounding the minute value of the difference down to the nearest quarter hour (operation 1006). For example, a minute value of 29 from the difference may be rounded down to a minute value of 15. The rounded minute value may then be added to or subtracted from UTC and/or the time zone of the time of transmission in the same way that the hour value was added to or subtracted from the time zone of the computer system and/or UTC. The rounded minute value may thus be used to identify quarter-hour offsets of the local time of the remote system from UTC and/or the time zone of the computer system.

Figure 11:
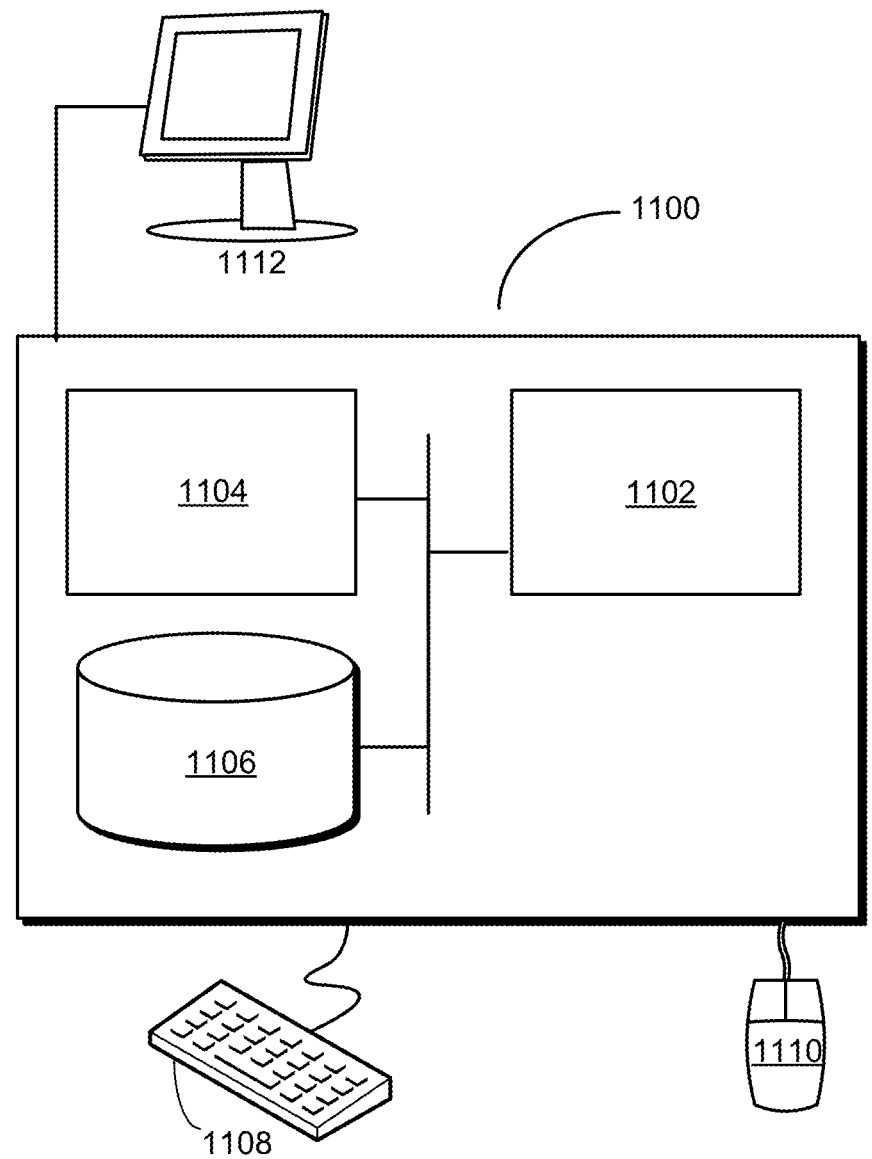
FIG. 11 shows a computer system in accordance with the disclosed embodiments.

FIG. 11 shows a computer system 1100. Computer system 1100 includes a processor 1102, memory 1104, storage 1106, and/or other components found in electronic computing devices. Processor 1102 may support parallel processing and/or multi-threaded operation with other processors in computer system 1100. Computer system 1100 may also include input/output (I/O) devices such as a keyboard 1108, a mouse 1110, and a display 1112.

Computer system 1100 may include functionality to execute various components of the present embodiments. In particular, computer system 1100 may include an operating system (not shown) that coordinates the use of hardware and software resources on computer system 1100, as well as one or more applications that perform specialized tasks for the user. To perform tasks for the user, applications may obtain the use of hardware resources on computer system 1100 from the operating system, as well as interact with the user through a hardware and/or software framework provided by the operating system.

In one or more embodiments, computer system 1100 provides a system for processing data. The system may send, to a remote system, a request for a local time at the remote system and record a time of transmission of the request. Next, the system may obtain, from the remote system, a response to the request, wherein the response includes the local time of the remote system. The system may then compute a difference between the time of transmission and the local time of the remote system to determine a time offset that accounts for a difference in time zones between the computer system and the remote system. Finally, the system may use the time offset to standardize timestamps associated with time-series data received from the remote system, wherein standardizing the timestamps associated with the time-series data includes adjusting the timestamps to conform to a time standard.

In addition, one or more components of computer system 1100 may be remotely located and connected to the other components over a network. Portions of the present embodiments (e.g., computer system, remote system, etc.) may also be located on different nodes of a distributed system that implements the embodiments. For example, the present embodiments may be implemented using a cloud computing system that standardizes timestamps of time-series data from a number of geographically distributed remote systems based on automatically identified time offsets of the remote systems.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
while processing raw time-series data received from a remote system into a plurality of events, identifying timestamps that lack time zone or time offset information in the time-series data, and associating a tag with each timestamp to indicate that the timestamp has not been adjusted;
sending, from a computer system to the remote system, a request for a local time of the remote system;
receiving, at the computer system from the remote system, a response to the request, wherein the response includes the local time of the remote system;
calculating an elapsed response time by subtracting a time of transmission of the request from a time that the response was received;
in response to the elapsed response time being greater than a threshold value, resending the request to the remote system until the elapsed response time is less than the threshold value;
in response to the elapsed response time being within the threshold value, computing a difference between a most recent time of transmission and a most recent received local time of the remote system to determine a time offset that accounts for a time difference between the computer system and the remote system;
using the time offset to standardize timestamps associated with each event in the plurality of events that has a tagged timestamp, wherein standardizing the timestamps associated with each event comprises adjusting the timestamps to conform to a time standard using the time offset.

2. The method of claim 1, further comprising:
recording, at the computer system, a time of receipt of the response from the remote system; and
using the time of receipt to verify the time offset.

3. The method of claim 1, further comprising:
using the difference between the time of transmission and the local time of the remote system to automatically detect a change in the time offset.

4. The method of claim 1,
wherein the difference between the time of transmission and the local time of the remote system is used to automatically detect a change in the time offset, and
wherein the change in the time offset is automatically detected by:
periodically transmitting the request to the remote system; and
detecting the change in the time offset of the remote system from a change in the difference between the time of transmission of the request and the local time of the remote system.

5. The method of claim 1, wherein computing the difference between the most recent time of transmission and the most recent received local time of the remote system to determine the time offset that accounts for the difference in time zones between the computer system and the remote system comprises:

using an hour value of the difference between the most recent time of transmission and the most recent received local time as an hour of the time offset.

6. The method of claim 1, wherein computing the difference between the most recent time of transmission and the most recent received local time of the remote system to determine the time offset that accounts for the difference in time zones between the computer system and the remote system comprises:

using an hour value of the difference between the most recent time of transmission and the most recent received local time as an hour of the time offset; and calculating a minute of the time offset by rounding a minute value of the difference between the most recent time of transmission and the most recent received local time of the remote system down to a nearest quarter hour.

7. The method of claim 1, wherein computing the difference between the most recent time of transmission and the most recent received local time of the remote system to determine the time offset that accounts for the difference in time zones between the computer system and the remote system comprises:

using an hour value of the difference between the most recent time of transmission and the most recent received local time as an hour of the time offset; and upon verifying a receipt of the response from the remote system in less than a quarter hour after the most recent time of transmission of the request, calculating a minute of the time offset by rounding a minute value of the difference between the most recent time of transmission and the most recent received local time of the remote system down to a nearest quarter hour.

8. The method of claim 1, wherein adjusting the timestamps to conform to the time standard comprises at least one of:

adding the time offset to the timestamps;

converting the timestamps to the most recent received local time of the remote system;

converting the timestamps to a local system time of the computer system; or converting the timestamps to timestamps using Coordinated Universal Time (UTC).

9. The method of claim 1, wherein the raw time-series data comprises at least one of:

log data;
network packet data;
configuration data;
message data;
performance data;
sensor data; or
application data.

10. The method of claim 1, wherein the raw time-series data in the plurality of events is searched using one or more extraction rules of a late-binding schema.

11. The method of claim 1, wherein using the time offset to
standardize timestamps associated with each event comprises:

associating standardized timestamps with each event based on the timestamps associated with the raw time-series data associated with each event and the time offset.

12. An apparatus, comprising:
one or more processors; and
a memory storing instructions that, when executed by the one or more processors, cause the apparatus to:

while raw time-series data received from a remote system is processed into a plurality of events, identify timestamps that lack time zone or time offset information in the time-series data, and associate a tag with each timestamp to indicate that the timestamp has not been adjusted;

send, from a computer system to the remote system, a request for a local time of the remote system;

receive, from the remote system, a response to the request, wherein the response includes the local time of the remote system;

calculate an elapsed response time by subtracting a time of transmission of the request from a time that the response was received;

in response to the elapsed response time being greater than a threshold value, resending the request to the remote system until the elapsed response time is less than the threshold value;

in response to the elapsed response time being within the threshold value, compute a difference between a most recent time of transmission and a most recent received local time of the remote system to determine a time offset that accounts for a difference in time zones between the computer system and the remote system;

use the time offset to standardize timestamps associated with each event in the plurality of events that has a tagged timestamp, wherein standardizing the timestamps associated with each event comprises adjusting the timestamps to conform to a time standard using the time offset.

13. The apparatus of claim 12, wherein the memory further stores instructions that, when executed by the one or more processors, cause the apparatus to:

record a time of receipt of the response from the remote system; and use the time of receipt to verify the time offset.

14. The apparatus of claim 12, wherein the memory further stores instructions that, when executed by the one or more processors, cause the apparatus to:

use the difference between the time of transmission and the local time of the remote system to automatically detect a change in the time offset.

15. The apparatus of claim 12, wherein compute the difference between the most recent time of transmission and the most recent received local time of the remote system to determine the time offset that accounts for the difference in time zones between the computer system and the remote system comprises:

using an hour value of the difference between the most recent time of transmission and the most recent received local time of the remote system as an hour of the time offset.

16. The apparatus of claim 12, wherein compute the difference between the most recent time of transmission and the most recent received local time of the remote system to determine the time offset that accounts for the difference in time zones between the computer system and the remote system comprises:

using an hour value of the difference between the most recent time of transmission and the most recent received local time of the remote system as an hour of the time offset; and upon verifying a receipt of the response from the remote system in less than a quarter hour after the most recent time of transmission of the request, calculating a minute of the time offset by rounding a minute value of the difference between the most recent time of transmission and the most recent received local time of the remote system down to a nearest quarter hour.

17. The apparatus of claim 12, wherein adjusting the timestamps to conform to the time standard comprises at least one of:
adding the time offset to the timestamps;
converting the timestamps to the most recent received local time of the remote system;
converting the timestamps to a local system time of the computer system; or
converting the timestamps to timestamps using Coordinated Universal Time (UTC).

18. The apparatus of claim 12, wherein the difference between the time of transmission and the local time of the remote system is used to automatically detect a change in the time offset, and
wherein the change in the time offset is automatically detected by:
periodically transmitting the request to the remote system; and
detecting the change in the time offset of the remote system from a change in the difference between the time of transmission of the request and the local time of the remote system.

19. The apparatus of claim 12, wherein the raw time-series data comprises at least one of:
log data;
network packet data;
configuration data;
message data;
performance data;
sensor data; or
application data.

20. The apparatus of claim 12, wherein the raw time-series data in the plurality of events is searched using one or more extraction rules of a late-binding schema.

21. A non-transitory computer-readable storage medium storing instructions that when executed by a computer cause the computer to perform:
while processing raw time-series data received from a remote system into a plurality of events, identifying timestamps that lack time zone or time offset information in the time-series data, and associating a tag with each timestamp to indicate that the timestamp has not been adjusted;
sending, from a computer system to the remote system, a request for a local time of the remote system;
receiving, at the computer system from the remote system, a response to the request, wherein the response includes the local time of the remote system;
calculating an elapsed response time by subtracting a time of transmission of the request from a time that the response was received;
in response to the elapsed response time being greater than a threshold value, resending the request to the remote system until the elapsed response time is less than the threshold value;
in response to the elapsed response time being within the threshold value, computing a difference between a most recent time of transmission and a most recent received local time of the remote system to determine a time offset that accounts for a time difference between the computer system and the remote system;
using the time offset to standardize timestamps associated with each event in the plurality of events that has a tagged timestamp, wherein standardizing the timestamps associated with each event comprises adjusting the timestamps to conform to a time standard using the time offset.

22. The non-transitory computer-readable storage medium of claim 21, wherein the instructions when executed by a computer cause the computer to further perform:
recording a time of receipt of the response from the remote system; and
using the time of receipt to verify the time offset.

23. The non-transitory computer-readable storage medium of claim 21, wherein the instructions when executed by a computer cause the computer to further perform:
using the difference between the time of transmission and the local time of the remote system to automatically detect a change in the time offset.

24. The non-transitory computer-readable storage medium of claim 21, wherein computing the difference between the most recent time of transmission and the most recent received local time of the remote system to determine the time offset that accounts for the difference in time zones between the computer system and the remote system comprises:
using an hour value of the difference between the most recent time of transmission and the most recent received local time as an hour of the time offset.

25. The non-transitory computer-readable storage medium of claim 21, wherein computing the difference between the most recent time of transmission and the most recent received local time of the remote system to determine the time offset that accounts for the difference in time zones between the computer system and the remote system comprises:
using an hour value of the difference between the most recent time of transmission and the most recent received local time as an hour of the time offset; and
upon verifying a receipt of the response from the remote system in less than a quarter hour after the most recent time of transmission of the request, calculating a minute of the time offset by rounding a minute value of the difference between the most recent time of transmission and the most recent received local time of the remote system down to a nearest quarter hour.

26. The non-transitory computer-readable storage medium of claim 21, wherein the raw time-series data comprises at least one of:
log data;
network packet data;
configuration data;
message data;
performance data;
sensor data; or
application data.

27. The non-transitory computer-readable storage medium of claim 21, wherein the difference between the time of transmission and the local time of the remote system is used to automatically detect a change in the time offset, and
wherein the change in the time offset is automatically detected by:
periodically transmitting the request to the remote system; and detecting the change in the time offset of the remote system from a change in the difference between the time of transmission of the request and the local time of the remote system.

28. The non-transitory computer-readable storage medium of claim 21, wherein adjusting the timestamps to conform to the time standard comprises at least one of:
adding the time offset to the timestamps;
converting the timestamps to the local time of the remote system;
converting the timestamps to a local system time of the computer system; or
converting the timestamps to timestamps using Coordinated Universal Time (UTC).

* * * * *